US012596958B2

(12) United States Patent
Smith et al.

(10) Patent No.: US 12,596,958 B2
(45) Date of Patent: Apr. 7, 2026

(54) APPARATUS AND METHODS FOR MULTIPLE STAGE PROCESS MODELING

(71) Applicant: The Strategic Coach Inc., Toronto (CA)

(72) Inventors: Barbara Sue Smith, Toronto (CA); Daniel J. Sullivan, Toronto (CA)

(73) Assignee: The Strategic Coach Inc., Toronto (CA)

( * ) Notice: Subject to any disclaimer, the term of this patent is extended or adjusted under 35 U.S.C. 154(b) by 23 days.

(21) Appl. No.: 18/414,718

(22) Filed: Jan. 17, 2024

(65) Prior Publication Data

US 2025/0232212 A1     Jul. 17, 2025

(51) Int. Cl.
*G06N 20/00*          (2019.01)
(52) U.S. Cl.
CPC .................................... *G06N 20/00* (2019.01)
(58) Field of Classification Search
CPC ...................................................... G06N 20/00
See application file for complete search history.

(56) References Cited

U.S. PATENT DOCUMENTS

| | | | | | |
|---|---|---|---|---|---|
| 9,799,227 | B2 * | 10/2017 | Arsac | ........................ | G09B 7/00 |
| 2014/0207527 | A1 | 7/2014 | Garvey | | |
| 2015/0339604 | A1 * | 11/2015 | Alikhan | ............. | G06Q 10/0635 |
| | | | | | 705/7.28 |
| 2017/0068895 | A1 * | 3/2017 | Kil | ........................... | G06N 7/01 |
| 2022/0245557 | A1 | 8/2022 | Minter | | |

| | | | | | |
|---|---|---|---|---|---|
| 2022/0309411 | A1 * | 9/2022 | Ramaswamy | ....... | G06Q 10/067 |
| 2022/0391814 | A1 | 12/2022 | Kothandaraman | | |
| 2023/0169434 | A1 * | 6/2023 | Kumar | ................. | G06Q 10/067 |
| | | | | | 705/7.37 |

OTHER PUBLICATIONS

Han, Rui, et al. "Slim ML: Removing non-critical input data in large-scale iterative machine learning." IEEE Transactions on Knowledge and Data Engineering 33.5 (Year: 2019).*
Long Chen, Hong. "Logit models for early warning of distressed capital projects." Journal of Business Economics and Management 14.sup1 (Year: 2013).*
Ayday, Erman et al., "A belief propagation based recommender system for online services." Proceedings of the fourth ACM conference on Recommender systems. (Year: 2010).*

* cited by examiner

*Primary Examiner* — Adam C Standke
(74) *Attorney, Agent, or Firm* — Caldwell LLC

(57)          ABSTRACT

An apparatus and method for multiple stage process modeling is provided. The apparatus includes a processor and a memory connected to the processor. The memory containing instructions configuring the a processor to receive process data sets, each process data set representing a progression stage that describes a sequence of activities performed by an entity device, generate, using the process data sets and a machine learning algorithm, a progression outlook profile including progression stage profiles, each progression stage profile representative of a respective progression stage and may generate progression actions describing progression from a first progression stage to a second progression stage based on input data, and a progression stage profile classifier that may use input data and identify a progression stage currently occupied by a process based on input data. The processor may receive process data describing a process to classify received process data to a progression stage profile.

17 Claims, 8 Drawing Sheets

Entrepreneurial Mastery Progression

 200C

| Stages | Description | Rating 204C | | | | | | | | | |
|---|---|---|---|---|---|---|---|---|---|---|---|
| 1 | Influence | 1 | 2 | 3 | 4 | 5 | 6 | 7 | 8 | 9 | 10 |
| | Intellectual Capital \| Collaboration \| Industry Bypass<br><br>You strategically pacakage your ideas and solutions. You continually reinforce the power of your Unique Process with new intellectual capital that disrupts your industry and transforms your clients' lives in uniquely positive ways. | | | | | | | | | | |
| 2 | Innovation | 1 | 2 | 3 | 4 | 5 | 6 | 7 | 8 | 9 | 10 |
| | Unique Process \| Leadership/Direction \| Creativity<br><br>You put everything you do into a process. You utilize the evolving Days of Supply (DOS) information to organize your value creation and leadership for all clients and opportunities within a multi-stage process of decision making and action. | | | | | | | | | | |
| 3 | Differentiation | 1 | 2 | 3 | 4 | 5 | 6 | 7 | 8 | 9 | 10 |
| | Hero Target \| Days of Supply (DOS) Factors \| Value Creation<br><br>You make it all about them, not about you. You base and develop all of your relationships and opportunities on DOS, transforming your impact and leadership in the market. | | | | | | | | | | |
| 4 | Profitability | 1 | 2 | 3 | 4 | 5 | 6 | 7 | 8 | 9 | 10 |
| | Largest/Minimum Cheques (Checks) \| Cash Flow \| Investments<br>You secure bigger and better Largest Cheque ® opportunities. You continually improve your personal and organizational capabilities by focusing on multiplier results and rewards from clients, products, and events. | | | | | | | | | | |
| 5 | Productivity | 1 | 2 | 3 | 4 | 5 | 6 | 7 | 8 | 9 | 10 |
| | Time Structure \| Unique Ability \| Teamwork/Technology<br>You achieve greater results with less time and effort. You increasingly focus your personal and organizational time and efforts on those activities where there is superior skill, passion, eneergy, and never-ending improvement. | | | | | | | | | | |

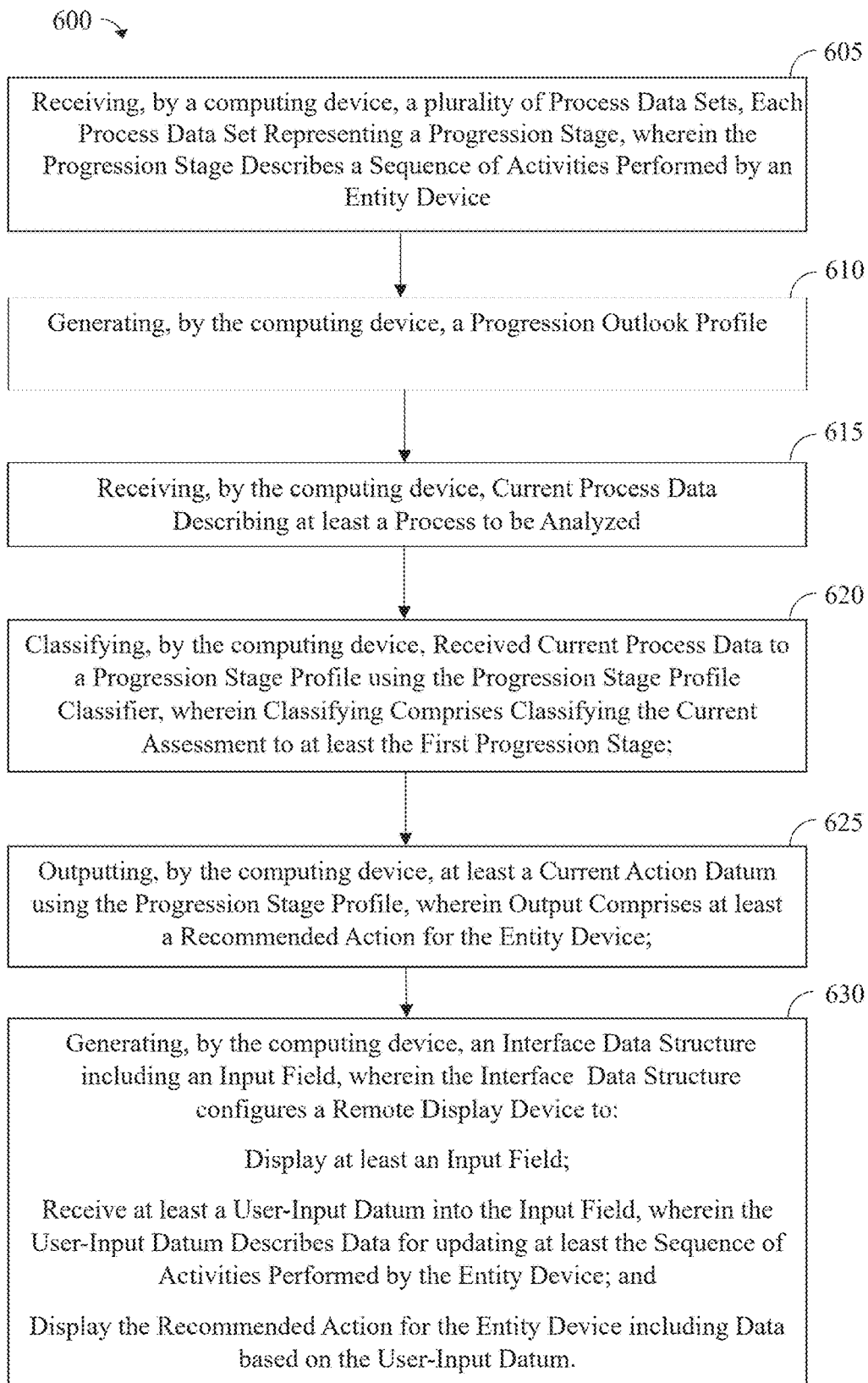

600

Receiving, by a computing device, a plurality of Process Data Sets, Each Process Data Set Representing a Progression Stage, wherein the Progression Stage Describes a Sequence of Activities Performed by an Entity Device

605

Generating, by the computing device, a Progression Outlook Profile

610

Receiving, by the computing device, Current Process Data Describing at least a Process to be Analyzed

615

Classifying, by the computing device, Received Current Process Data to a Progression Stage Profile using the Progression Stage Profile Classifier, wherein Classifying Comprises Classifying the Current Assessment to at least the First Progression Stage;

620

Outputting, by the computing device, at least a Current Action Datum using the Progression Stage Profile, wherein Output Comprises at least a Recommended Action for the Entity Device;

625

Generating, by the computing device, an Interface Data Structure including an Input Field, wherein the Interface Data Structure configures a Remote Display Device to:

Display at least an Input Field;

Receive at least a User-Input Datum into the Input Field, wherein the User-Input Datum Describes Data for updating at least the Sequence of Activities Performed by the Entity Device; and Display the Recommended Action for the Entity Device including Data based on the User-Input Datum.

APPARATUS AND METHODS FOR MULTIPLE STAGE PROCESS MODELING

FIELD OF THE INVENTION

The present invention generally relates to the field of artificial intelligence (AI). In particular, the present invention is directed to an apparatus and methods for multiple stage process modeling.

BACKGROUND

Recent increases in computational efficiency have enabled iterative analysis of data describing complex phenomena; however, models tend to suffer from inaccuracy when used to analyze processes that change in nature over time. Prior programmatic attempts have tended to suffer from excessive retraining needs or computational complexity, decreasing their practical use.

SUMMARY OF THE DISCLOSURE

In an aspect, an apparatus for multiple stage process modeling is provided. The apparatus includes at least a processor and a memory connected to the processor. The memory contains instructions configuring the processor to receive process data sets, each process data set representing a progression stage, where the progression stage describes a sequence of activities performed by an entity device. In addition, the processor may generate, using at least some process data sets and a machine learning algorithm, a progression outlook profile including progression stage profiles, each progression stage profile representative of a respective progression stage and that may generate progression actions describing progression from a first progression stage to a second progression stage based on input data. The progression outlook profile also includes a progression stage profile classifier that may use input data and identify a progression stage currently occupied by a process based on input data. The processor may receive current process data describing at least a process to be analyzed, where the process includes a current assessment of the sequence of activities performed by the entity device and classify received current process data to a progression stage profile using the progression stage profile classifier. Classifying includes classifying the current assessment to at least the first progression stage.

In another aspect, a method for multiple stage process modeling is provided. The method includes receiving, by a computing device, process data sets, each process data set representing a progression stage, where the progression stage describes a sequence of activities performed by an entity device, generating, by the computing device, using at least some process data sets and a machine learning algorithm, a progression outlook profile including progression stage profiles, each progression stage profile representative of a respective progression stage and that may generate progression actions describing progression from a first progression stage to a second progression stage based on input data. The progression outlook profile may also include a progression stage profile classifier that may use input data and identify a progression stage currently occupied by a process based on input data. The method includes receiving, by the computing device, current process data describing at least a process to be analyzed, where the process includes a current assessment of the sequence of activities performed by the entity device, and classifying, by the computing device, received current process data to a progression stage profile using the progression stage profile classifier, where classifying includes classifying the current assessment to at least the first progression stage. The method includes outputting, by the computing device, at least a current action datum using the progression stage profile, where output includes at least a recommended action for the entity device. Still further, the method includes generating, by the computing device, an interface data structure including an input field, where the interface data structure configures a remote display device to display at least an input field, receive at least a user-input datum into the input field, where the user-input datum describes data for updating at least the sequence of activities performed by the entity device, and display the recommended action for the entity device including data based on the user-input datum.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 2C is a diagrammatic representation of a sample display screen generated by the interface data structure of FIGS. 2A-2B;

FIG. 6 is a flow diagram of an exemplary method for multiple stage process modeling;

Figure 1:
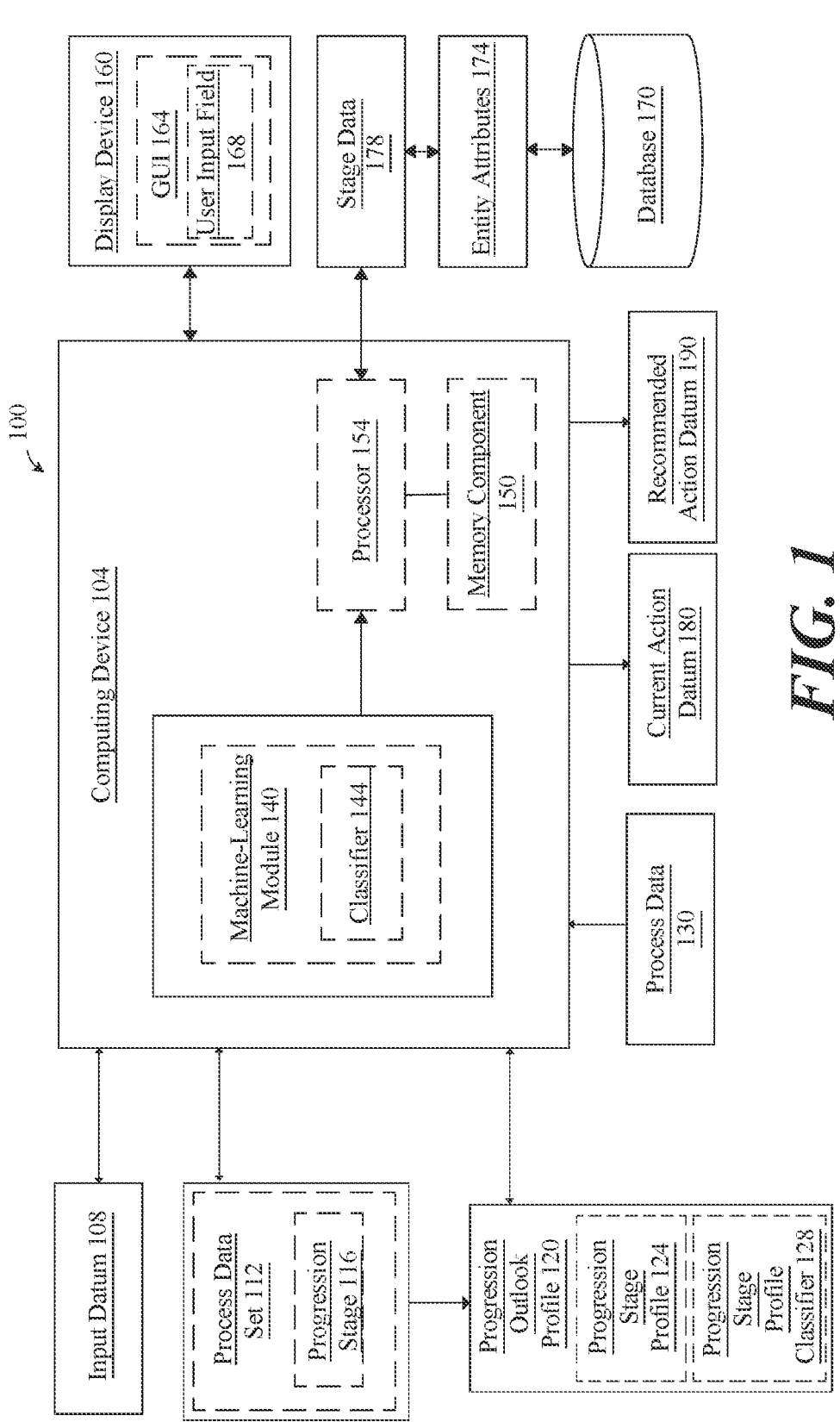
FIG. 1 is a block diagram of an embodiment of an apparatus for multiple stage process modeling.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and methods for determining a resource distribution. Described processes are executed by a processor and a memory connected to the processor. The memory contains instructions configuring a processor to receive "process data sets," which, as used herein, are data sets describing processes to be analyzed. Processes may include without limitation any processes that can traverse growth stages, including without limitation processes of an entity, or one or more inter-related entities, initiated by an entrepreneur or entrepreneurial group, etc. That is, such "process data sets" can include data describing incorporation of a new corporation or the formation of, for example, a limited liability company, and its progression regarding developing new products and offering new services to paying customers, clients, and the like. In that regard, each process data set represents a "progression stage," which, as used herein, is defined as a sequence of activities performed by an entity device, such as a smartphone or tablet communicatively connected with an entity, such as computer servers of a business and the like. In some embodiments, each "progression stage" may correspond to a stage of compiling a computer program, such as lexical analysis, symbol table construction, syntax analysis, semantic analysis, code generation, and optimization. In addition, or the alternative, each "progression stage" may also correspond to and thereby indicate a distinct phase in the development and growth of a business, such as inception (or "seed"), startup, growth, establishment, expansion, maturity, and exit. Any one stage of compiling a computer program may be used to model any stage of growth of a business. Those skilled in the art will appreciate that other techniques and processes may be employed to achieve the scope and purpose of the disclosure.

In addition, the processor may generate, using at least some of the above-described process data sets and a machine learning algorithm, a progression outlook profile, which, as used herein, includes progression stage profiles, where each progression stage profile is representative of a respective progression stage as described above. As used in this disclosure, a "progression stage profile" is a data structure that is configured to calculate or output current action data. A progression stage profile may include, without limitation, a machine-learning model that outputs data representing process outputs when inputting data representing process inputs. Training data used to train such progression stage profile may include datasets correlating process input data examples to process output data examples. Each progression stage profile may be trained using training data and, for instance, a supervised machine-learning model. Progression stage profile classifier, as described below, may select and/or be used to select either progression stage profiles that have been trained and/or training data usable to train, or retrain, a progression stage profile.

Accordingly, each progression stage profile may generate "progression actions" describing progression from a first progression stage, such as data describing new business entity formation and initial startup operations, to a second progression stage, such as large-scale enterprise operations, based on input data (e.g., input datum 108 in FIG. 1).

The progression outlook profile also includes a "progression stage profile classifier" (e.g., classifier 144 of machine-learning module 140 of FIG. 1) that may use input data and identify a progression stage currently occupied by a "process" based on input data. Process stage classifier may be implemented in any manner described in this disclosure for classifiers. Process stage classifier may be trained using training data and/or examples that correlate process data to process stage models; such examples may be created by user labeling indicating appropriate process stage models given process data.

Processor may receive current process data describing at least a process, as described above, to be analyzed. Process includes a current assessment, such as negative, positive, or neutral, of a sequence of activities. Accordingly, the processor may classify received current process data to a progression stage profile using the progression stage profile classifier. Classifying includes classifying the current assessment to at least the first progression stage. In addition, the processor may output at least a "current action datum" using the progression stage profile, where output includes at least a recommended action for the entity device. As used herein, "current action datum" (e.g., current action datum 180 of FIG. 1) describes advisable steps, like a business plan, for the entity using the described processes to favorably progress to the next stage of success. For example, the current action datum may describe a company's objectives and how it plans to achieve its goals, using definite milestones and achievement targets.

In some embodiments, use of progression stage profile classifier permits selection of more efficient machine-learning models, corresponding to different progression stages, enabling more efficient modeling at each such stage. This improves the efficiency with which an apparatus and/or computing device is able to perform such modeling and makes management of data structures underlying and/or making up such modeling more efficient and effective.

In addition, the memory contains instructions configuring at least a processor to generate an "interface data structure" including an input field based on ranking the first transfer datum and the second transfer datum. An "interface data structure," as used in this disclosure, is an example of data structure used to "query," such as by digitally requesting, for data results from a database and/or for action on the data. "Data structure," in the field of computer science, is a data organization, management, and storage format that is usually chosen for efficient access to data. More particularly, a "data structure" is a collection of data values, the relationships among them, and the functions or operations that can be applied to the data. Data structures also provide a means to manage relatively large amounts of data efficiently for uses such as large databases and internet indexing services. Generally, efficient data structures are essential to designing efficient algorithms. Some formal design methods and programming languages emphasize data structures, rather than algorithms, as an essential organizing factor in software design. In addition, data structures can be used to organize the storage and retrieval of information stored in, for example, both main memory and secondary memory.

"Interface data structure," as used herein, refers to, for example, a data organization format used to digitally request a data result or action on the data. In addition, the "interface data structure" can be displayed on a display device, such as a digital peripheral, smartphone, or other similar device, etc. interface data structure may be generated based on received "entity data," defined as including historical data of the user. Historical data may include attributes and facts about an entity that are already publicly known or otherwise available, such as prior time allocations spent on certain activity patterns, such as leisure, education, income-generation, etc. In some embodiments, interface data structure prompts may be generated by a machine-learning model. As a non-limiting example, the machine-learning model may receive user data and output interface data structure queries.

As used herein, the processor may generate an interface data structure including an input field, where the interface data structure configures a remote display device to display at least an input field, receive at least a user-input datum into the input field, where the user-input datum describes data for updating at least the sequence of activities performed by the entity device (e.g., that may be reflective of changes in current business operations, etc.), and display the recommended action for the entity device including data based on the user-input datum.

Referring now to FIG. 1, an exemplary embodiment of apparatus 100 for multiple stage process modeling is provided. In one or more embodiments, apparatus 100 includes computing device 104, which may include without limitation a microcontroller, microprocessor (also referred to in this disclosure as a "processor"), digital signal processor (DSP) and/or system on a chip (SoC) as described in this disclosure. Computing device 104 may include a computer system with one or more processors (e.g., CPUs), a graphics processing unit (GPU), or any combination thereof. Computing device 104 may include a memory component, such as memory component 150, which may include a memory, such as a main memory and/or a static memory, as discussed further in this disclosure below. Computing device 104 may include a display component (e.g., display device 160, which may be positioned remotely relative to computing device 104), as discussed further below in the disclosure. In one or more embodiments, computing device 104 may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices, as described below in further detail, via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, any combination thereof, and the like. Examples of a network include, but are not limited to, a wide area network (e.g., the Internet, an enterprise network), a local area network (e.g., a network associated with an office, a building, a campus, or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software, etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks, as described below, across a plurality of computing devices of computing device 104, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of apparatus 100 and/or computing device 104.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 is configured to receive at least an element of input datum 108, which may include data describing operational indicators of an entity, such as a startup. In one or more embodiments, input datum 108 may be aggregated with additional instances of input datum 108 to generate input data, which may be used by any one or more of the described processes herein. Input data may describe discrete achievement-related milestones achieved by an entity, such as a startup initiated by an entrepreneur, at specific discrete points in time. That is, input data may describe one or more distinct phases in the development and growth of a business, such as inception (or "seed"), startup, growth, establishment, expansion, maturity, and exit, and may be represented by various forms or data types, including, for example, lexical analysis, symbol table construction, syntax analysis, semantic analysis, code generation, and optimization. Accordingly, input datum 108 may describe development of new products and services, expansion in offerings of those products and services to new or additional customers, increases in distributional efficiency relating to improving cashflow, revenue, and profits, and other business-related topics indicated by display screen 200C of FIG. 2C, including influence, innovation, differentiation, profitability, and productivity. Input data may be used be described processes to calculate and/or generate recommendation action datum 190 relating to improving or maintaining business throughout efficiency relating to attaining enumerated target objectives.

In some embodiments, input datum 108 may be input into computing device 104 manually by the client, who may be associated with any type or form of establishment (e.g., a business, university, non-profit, charity, etc.), or may be an independent entity (e.g., a solo proprietor, an athlete, an artist, etc.). In some instances, input datum 108 may be extracted from a business profile, such as that may be available via the Internet on LinkedIn®, a business and employment-focused social media platform that works through websites and mobile apps owned my Microsoft® Corp., of Redmond, WA). More particularly, such a business profile may include the past achievements of a user in various fields such as business, finance, and personal, depending on one or more related circumstances. Persons skilled in the art, upon reviewing the entirety of this disclosure, will be aware of various other ways or situations in which input datum 108 may be input, generated, or extracted for various situations and goals. For example, in an example where the client is a business, input datum 108 may be extracted from or otherwise be based on the client's business profile, which may include various business records such as financial records, inventory record, sales records, and the like. In addition, in one or more embodiments, input datum 108 may be generated by evaluating interactions with external entities, such as third parties.

In addition, in one or more embodiments, input datum 108 may be acquired using web trackers or data scrapers. As used herein, "web trackers" are scripts (e.g., programs or sequences of instructions that are interpreted or carried out by another program rather than by a computer) on websites designed to derive data points about user preferences and identify. In some embodiments, such web trackers may track activity of the user on the Internet. Also, as used herein, "data scrapers" are computer programs that extract data from human-readable output coming from another program. For example, data scrapers may be programmed to gather data on user from user's social media profiles, personal websites, and the like. In some embodiments, input datum 108 may be numerically quantified (e.g., by data describing discrete real integer values, such as 1, 2, 3 . . . n, where n=a user-defined or prior programmed maximum value entry, such as 10, where lower values denote lesser significance relating to progression from a first progression stage to a second progression stage based on input datum 108, and vice-versa. For example, progression stage profile classifier 128 may be configured to use aggregated input datum 108 (e.g., input data) and thereby identify a progression stage currently occupied by a process based on input data. Higher values, such as 5, 6, 7, . . . n can denote a relatively higher correlation or significance relating to progression from a first progression stage to a second progression stage based on input datum 108. That is, data describing "influence" of an entity (e.g., displayed by display screen 200C of FIG. 2C), such as a startup, including discrete measurements of intellectual capital, collaboration, and/or industry bypass, where transitioning from a first progression stage to a second progression stage is indicated as relatively likely based on input datum 108, etc.

Still referring to FIG. 1, other example values are possible along with other exemplary attributes and facts about a client (e.g., a business entity, or an aspiring athlete) that are already known and may be tailored to a particular situation where explicit business guidance (e.g., provided by the described recommended action datum 190) is sought. In one or more alternative embodiments, input datum 108 may be described by data organized in or represented by lattices, grids, vectors, etc., and may be adjusted or selected as necessary to accommodate entity-defined circumstances or any other format or structure for use as a calculative value that a person skilled in the art would recognize as suitable upon review of the entirety of this disclosure.

In one or more embodiments, input datum 108 may be provided to or received by computing device 104 using various means. In one or more embodiments, input datum 108 may be provided to computing device 104 by a business, such as by a human authorized to act on behalf of the business including any type of executive officer, an authorized data entry specialist or other type of related professional, or other authorized person or digital entity (e.g., software package communicatively coupled with a database storing relevant information) that is interested in improving and/or optimizing performance of the business overall, or in a particular area or field over a defined duration, such as a quarter or six months. In some examples, a human may manually enter input datum 108 into computing device 104 using, for example, user input field 168 of graphical user interface (GUI) 136 of display device 160. For example, and without limitation, a human may use display device 160 to navigate the GUI 164 and provide input datum 108 to computing device 104. Non-limiting exemplary input devices include keyboards, joy sticks, light pens, tracker balls, scanners, tablets, microphones, mouses, switches, buttons, sliders, touchscreens, and the like. In other embodiments, input datum 108 may be provided to computing device 104 by a database over a network from, for example, a network-based platform. Input datum 108 may be stored, in one or more embodiments, in database 170 and communicated to computing device 104 upon a retrieval request from a human and/or other digital device (not shown in FIG. 1) communicatively connected with computing device 104. In other embodiments, input datum 108 may be communicated from a third-party application, such as from a third-party application on a third-party server, using a network. For example, input datum 108 may be downloaded from a hosting website for a particular area, such as a networking group for small business owners in a certain city, or for a planning group for developing new products to meet changing client expectations, or for performance improvement relating to increasing business throughput volume and profit margins for any type of business, ranging from smaller start-ups to larger organizations that are functioning enterprises. In one or more embodiments, computing device 104 may extract input datum 108 from an accumulation of information provided by database 170. For instance, and without limitation, computing device 104 may extract needed information database 170 regarding improvement in a particular area sought-after by the business and avoid taking any information determined to be unnecessary. This may be performed by computing device 104 using a machine-learning model, which is described in this disclosure further below.

At a high level, and as used herein, "machine-learning" describes a field of inquiry devoted to understanding and building methods that "learn"—that is, methods that leverage data to improve performance on some set of defined tasks. Machine-learning algorithms may build a machine-learning model based on sample data, known as "training data," to make predictions or decisions without being explicitly programmed to do so. Such algorithms may function by making data-driven predictions or decisions by building a mathematical model from input data. This input data used to build the machine-learning model may be divided into multiple data sets. In one or more embodiments, three data sets may be used in different stages of the creation of the machine-learning model: training, validation, and test sets.

With continued reference to FIG. 1, described machine-learning models may be initially fit on a training data set, which is a set of examples used to fit parameters. Here, example training data sets suitable for preparing and/or training described machine-learning processes may include data relating to historic business operations under historic circumstances, or circumstances in certain enumerated scenarios, such as during a period low interest rates or relatively easy bank lending, or during a period of highly restrictive fiscal policy implemented to control and address undesirably high inflation. Such training sets may be correlated to similar training sets of entity attributes 174 relating to attributes of an entity. In the described example of input datum 108 relating to business operations, entity attributes 174 may describe one or more elements, datum, data and/or attributes relating to entity engagement with services provided by the entity.

In addition, in one or more embodiments, computing device 104 is configured to receive at least an element of process data set 112. As introduced earlier, "process data sets," which, as used herein, are data sets describing operational processes of an entity, or one or more inter-related entities, initiated by an entrepreneur or entrepreneurial group, etc. That is, such "process data sets" can include data describing incorporation of a new corporation or the formation of, for example, a limited liability company, and its progression regarding developing new products and offering new services to paying customers, clients, and the like. In that regard, each process data set represents a "progression stage," which, as used herein, is defined as a sequence of activities performed by an entity device, such as a smartphone or tablet communicatively connected with an entity, such as computer servers of a business and the like. In some embodiments, each "progression stage" may correspond to a stage of compiling a computer program, such as lexical analysis, symbol table construction, syntax analysis, semantic analysis, code generation, and optimization. In addition, or the alternative, each "progression stage" may also correspond to and thereby indicate a distinct phase in the development and growth of a business, such as inception (or "seed"), startup, growth, establishment, expansion, maturity, and exit. Any one stage of compiling a computer program may be used to model any stage of growth of a business. Those skilled in the art will appreciate that other techniques and processes may be employed to achieve the scope and purpose of the disclosure.

Still referring to FIG. 1, more particularly, in one or more embodiments, memory component 150 is connected to processor 154 and contains instructions configuring processor 154 to receive a plurality of process data sets (e.g., multiple instances of process data set 112). Each process data set 112 represents a corresponding progression stage 116, which describes a sequence of activities (e.g., new business development and growth) performed by an entity device. Accordingly, processor 154 may generate, using at least some of the plurality of process data sets and a machine learning algorithm, progression outlook profile 120 comprising a plurality of progression stage profiles (e.g., multiple instances of progression stage profile 124). Each progression stage profile 124 may be representative of a respective progression stage and may be configured to generate progression actions describing progression from a first progression stage to a second progression stage based on input data (e.g., multiple instances of input datum 108).

In addition, progression outlook profile 120 may include progression stage profile classifier 128, which may be configured to use input data and identify a particular instance of progression stage 116 currently occupied by a "process" based on input data. As used herein and generally understood in the fields finance and entrepreneurship, a "process," alternatively referred to as a "business process," is a collection of related, structured activities or tasks by people or equipment in which a specific sequence produces a service or product for a particular customer or customers. Types of business processes may include "core processes," "support processes," and "management processes." "Core processes," as used herein, are the critical functions of a business that directly add value to the end customers. These processes are critically aligned with the fundamental values, objectives, and vision of the business. Businesses must continuously monitor and improve these processes as they primarily contribute to the growth and revenue flow of the organization. "Support processes," as used herein, are processes that enable and support the core processes to be performed seamlessly. Although they may not contribute to revenue generation, they assist internal departments in creating a collaborative environment where the core processes can be aligned to work better. Human resources, finance management, administration, and operations may fall under "supporting processes" as they help expand a business. "Management processes," as used herein, are processes that are responsible for planning, monitoring, managing, and controlling the core and supporting processes from start to end. These processes are goal-oriented and ensure that business operations are carried out efficiently and seamlessly. Their focus is to monitor business functionalities internally and externally, analyze opportunities and challenges, and ensure continuous improvement of all processes. Described processes may use or otherwise function with various forms of "business process technology," which, as used herein, refers to the use of technology, such as software and systems, to automate, streamline, and optimize business processes. It helps organizations improve efficiency, reduce errors, and save time and resources on manual task completion. It can be customized as per needs and can be used in a variety of industries. Workflow management software, Customer Relationship Management (CRM) systems, and Enterprise Resource Planning (ERP) systems are a few examples of business process technology.

Still referring to FIG. 1, processor 154 may receive current process data 130 describing at least a process (as described above) to be analyzed. The process includes a current assessment of the sequence of activities (e.g., new business inception, growth, and performance) performed by the entity device. Accordingly, processor 154 may classify received current process data 130 to a progression stage profile 124 using the progression stage profile classifier 128. In some embodiments, classifying comprises classifying the current assessment to at least the first progression stage. In addition, in some instances, classifying received current process data to a progression stage profile using the progression stage profile classifier includes organizing at least some profiles based on their respective proximity to a minimal profile type and a maximum profile type, aggregating at least an instance of the sequence of activities performed by an entity device based on classification, and classifying aggregated entity data to a profile within a proximity to the maximum profile type. Next, processor 154 may output at least current action datum 180 using the progression stage profile 124, where output at least a recommended action (e.g., denoted by recommended action datum 190) for the entity device.

Figure 2B:
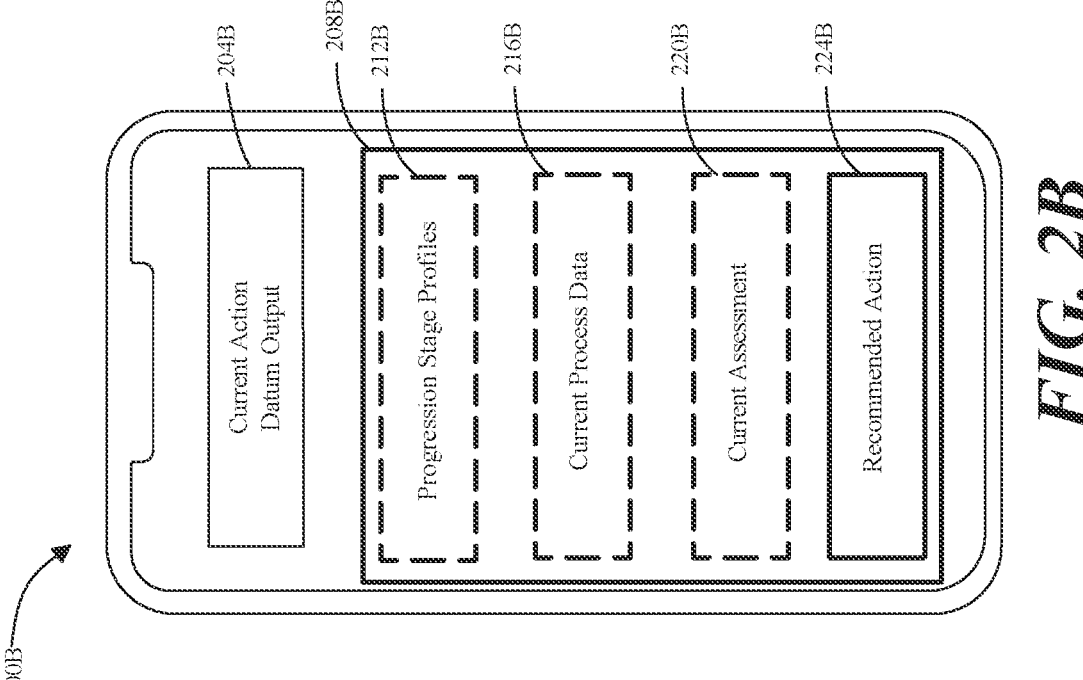
FIGS. 2A-2B are diagrammatic representations of multiple exemplary embodiments of output generated by an interface data structure.

In addition, in one or more embodiments, processor 154 may next generate an interface data structure including user input field 168, where the interface data structure configures a remote display device (e.g., display device 160) to display at least an input field and receive at least user-input datum 224A into input field 220A. More particularly, user-input datum 224A describes data for updating at least the sequence of activities performed by the entity device. Accordingly, display device 160 may display recommended action datum 190 (also denoted as recommended action 224B of FIG. 2B) for the entity device including data based on user-input datum 224A. In some embodiments, generating the interface data structure includes retrieving data describing attributes of the entity device (e.g., denoted as entity attributes 174) from database 170 communicatively connected to processor 154, and generating the interface data structure based on the data describing attributes of the entity device. In addition, generating the interface data structure may include determining at least vector 212C from a current assessment (denoted as first category 204C of display screen 200C) to the second progression stage (denoted by second category 208C of display screen 200C), and configuring the remote display device to display a representation of at least the vector. Those skilled in the art will appreciate that additional or fewer representations of progression from an initial progression stage to a subsequent progression stage based on input data may be displayed by display screen 200C. That is, example vectors may include vector 216C, vector 220, and vector 224C, each vector representing incremental progression reflective of an entity inputting user-input datum 224A describing data for updating at least the sequence of activities performed by the entity device, where such updates are indicative of performance improvement as reflected by corresponding categorization improvement. That is, a business upon its inception may have first category 204C of a "2" as indicated in FIG. 2C due to challenges, slowdowns and other business environment unfamiliarity that can be encountered upon inception. Over time and responsive to receiving and acting upon recommended action datum 190, an entity device representative of an entity, such as a business, may adjust and improve its practices based on recommended action datum 190, such that display screen 200C may display such incremental improvements in at least second category 208C, and the like.

Referring now to FIG. 2C, in some embodiments, determining vector 212C from current assessment (denoted as first category 204C of display screen 200C) to the second progression stage (denoted by second category 208C of display screen 200C) includes generating the vector including an angle value and a distance value, where the angle value and the distance value describe at least a divergence value (not shown in FIG. 2C) between the current assessment to the second progression stage. As used herein, and in the field of computer science, a computation is said to diverge if it does not terminate or terminates in an exceptional state. Otherwise, it is said to converge. In domains where computations are expected to be infinite, such as process calculi, a computation is said to diverge if it fails to be productive (e.g., to continue producing an action within a finite amount of time). Here, current assessment (denoted as first category 204C of display screen 200C) describes phenomenon dissimilar to second progression stage (denoted by second category 208C of display screen 200C), thereby facilitating calculation of the described "divergence" value. In some instances, the interface data structure configures display device 160 to generate at least an additional input field based on the divergence value, which describes divergence between the current assessment and the second progression stage, e.g., potentially demonstrating that the entity is not progressing rapidly enough or sufficiently enough based on receipt of recommended action datum 190. In such circumstances, the user-input datum describes data for updating at least the sequence of activities performed by the entity device, such that the sequence of activities may be updated, changed, or improved upon more rapidly by the entity as represented by the entity device. Accordingly, display device 160 may then display such an expedited or upgraded variant of recommended action datum 190 for the entity device including data based on user-input datum 224A.

Returning to FIG. 1, in some embodiments, generating the recommended action for the entity device includes retrieving data describing current preferences of the entity device between a minimum value and a maximum value from a database communicatively connected to the processor. Retrieving data such data may include receiving at least a form element input into the input field. In addition, generating at least an additional input field may be based on a divergence value that describes divergence between the current assessment to the second progression stage.

Still referring to FIG. 1, in one or more embodiments, generating recommended action 224B for the entity device comprises classifying at least an instance of the current assessment (denoted at first category 204C of FIG. 2C) to the second progression stage (denoted as second category 208C of FIG. 2C), determining a proximity of a respective current assessment to the second progression stage calculated based on at least user-input datum 224A; and adjusting recommended action datum 190 to reduce the proximity. "Proximity," as used herein and in the field of data science, is one or more mathematical techniques that calculate the similarity or dissimilarity of data points, such as how alike objects are to one another. In addition, in some embodiments, proximity-based methods assume that an object is an outlier if the nearest neighbors of the object are far away in feature space, that is, the proximity of the object to its neighbors significantly deviates from the proximity of most of the other objects to their neighbors in the same data set.

Still referring to FIG. 1, in some embodiments, generating the recommended action for the entity device includes classifying the current assessment to the second progression stage, where classifying the current assessment includes comparing the current assessment to the second progression stage and determining a "parity value" based on comparison of the current assessment to the second progression stage. In some instances, the parity value is included within recommended action datum 190. As used herein, and the fields of computer science and data science, parity (from the Latin "paritas," meaning equal or equivalent) is analytical technique that checks whether data has been lost or written over when it is moved from one place in storage to another or when it is transmitted between computers. Since data transmission may not be an entirely error-free process, data may not always be received in the same way as it was transmitted. A parity bit adds "checksums," which are small-sized blocks of data derived from another block of digital data for the purpose of detecting errors that may have been introduced during its transmission or storage, into data that enable the target device to determine whether the data was received correctly. An additional binary digit, the parity bit, may be added to a group of bits that are moved together. This bit, sometimes referred to as a check bit, is used only to identify whether the moved bits arrived successfully.

Still referring to FIG. 1, in some embodiments, generating recommended action datum 190 for the entity device includes determining a pattern, where the pattern describes entity interaction with database 170 communicatively connected to processor 154, classifying at least an element of the pattern to the divergence value (as calculated, determined and/or described earlier), and adjusting the pattern based on a magnitude of the divergence value. In addition, in some embodiments, generating recommended action datum 190 for the entity device includes classifying one or more new instances of user-input datum 224A to at least the second progression stage, generating at least a divergence value between user-input datum 224A and at least the second progression stage based on the classification, and displaying the divergence value.

With continued reference to FIG. 1, accordingly, memory component 150 may contain instructions configuring processor 154 to classify at least input datum 108, process data set 112 and progression outlook profile 120 to a stage from progression stage profile database 300, such as first progression stage 304 (e.g., which may correspond to first category 204C shown in FIG. 2C), second progression stage 308 (e.g., which may correspond to second category 208C), third progression stage 312 and fourth progression stage 316. Those skilled in the art will appreciate that additional or fewer example progression stages may be included in progression stage profile database 300 without departing from the spirit and scope of the disclosure. That is, more particularly, "stages," as used with relation to progression stage profile database 300, are datum, elements, or data describing discrete categorizations of activity patterns, such as first progression stage 304, second progression stage 308, third progression stage 312, and fourth progression stage 316 of resource allocation database 300, which may be one example of database 170 of FIG. 1. Classification is described further herein and may include predictive modeling involving assigning, by classifier 144, a class label to input examples, using binary classification, which refers to predicting one of two classes, or multi-class classification, which involves predicting one of more than two classes.

Multi-label classification involves predicting one or more classes for each example and imbalanced classification refers to classification tasks where the distribution of examples across the classes is not equal. That is, input datum 108, when describing to income-generating activities, may be classified to second progression stage 308 by classifier 144 and process data set 112, when describing cost-reduction activities undertaken during initiation of a new business, may be classified to first progression stage 304, and so on, etc. In some embodiments, classifier 144 may further prioritize second progression stage 308 over first progression stage 304 based on progression stage profile 124, if progression stage profile 124 describes such preferences and/or data, etc. In addition, in one or more embodiments, memory component 150 may include instructions configuring processor 154 to generate an interface data structure including user input field 168, where the interface data structure configures display device 160 to display user input field 168 and receive at least user-input datum 224A into user input field 168, where user-input datum describes data for updating progression stage profile 124.

Figure 4:
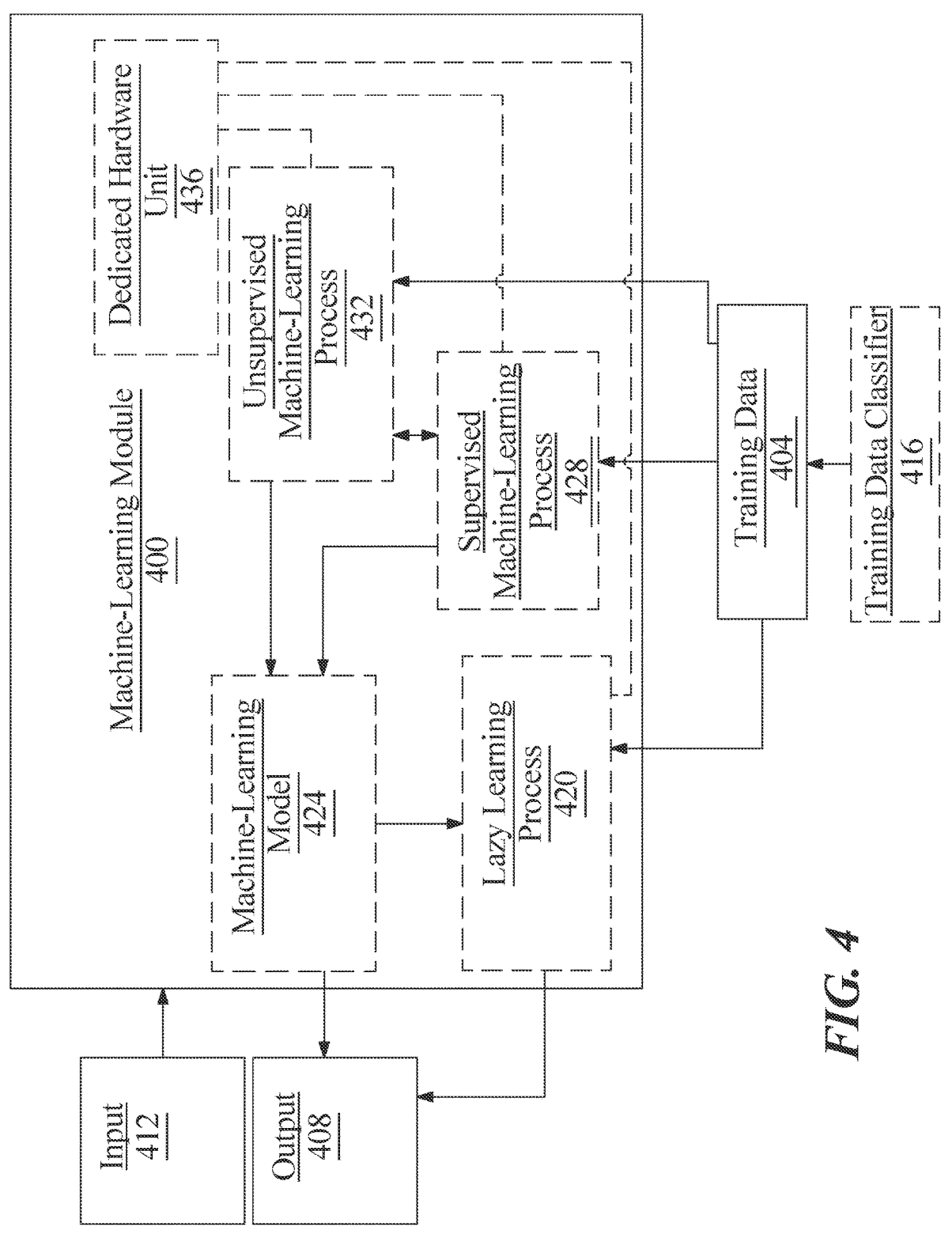
FIG. 4 is a block diagram of exemplary machine-learning processes.

Still referring to at least FIG. 1, and as described further herein with relation to FIG. 4, a "machine-learning process," as used in this disclosure, is a process that automatedly uses training data to generate an algorithm that will be performed by a computing device/module (e.g., computing device 104 of FIG. 1) to produce outputs given data provided as inputs. Any machine-learning process described in this disclosure may be executed by machine-learning module 140 of computing device 104 to manipulate and/or process progression outlook profile 120 relating to describing instances or characteristics of confidence for the user.

"Training data," as used herein, is data containing correlations that a machine-learning process may use to model relationships between two or more categories of data elements. For instance, and without limitation, training data, in this instance, may include multiple data entries, each entry representing a set of data elements that were recorded, received, and/or generated together and described various confidence levels or traits relating to demonstrations of confidence. Data elements may be correlated by shared existence in each data entry, by proximity in a given data entry, or the like. Multiple categories of data elements may be related in training data according to various correlations, which may indicate causative and/or predictive links between categories of data elements, which may be modeled as relationships such as mathematical relationships by machine-learning processes as described in further detail below. In addition, training data may be formatted and/or organized by categories of data elements, for instance by associating data elements with one or more descriptors corresponding to categories of data elements.

For instance, a supervised learning algorithm (or any other machine-learning algorithm described herein) may include one or more instances of progression outlook profile 120 describing confidence of a user as described above as inputs. Accordingly, computing device 104 of FIG. 1 may receive user-input datum 224A into input field 148 of display device 160. User-input datum 224A may describe data for updating progression stage profile 124 that is at least initially described by, for example progression outlook profile 120. In addition, in some embodiments, either the user or a third-party may dictate progression outlook profile 120 by inputting progression outlook profile 120 into computing device 104. Classifier 144 of machine-learning module 140 may classify one or more instances of progression outlook profile 120 relative to, for example, the second progression stage based on input data.

Still referring to FIG. 1, in some embodiments, a scoring function representing a desired form of relationship to be detected between inputs and outputs may be used by described machine learning processes. Such as scoring function may, for instance, seek to maximize the probability that a given input (e.g., input datum 108) and/or combination of elements and/or inputs (e.g., process data set 112 including progression stage 116) is associated with a given output (e.g., recommended action datum 190) to minimize the probability that a given input (e.g., progression outlook profile 120) is not associated with a given undesirable output (e.g., a variant of recommended action datum 190 that fails to progress the entity to the second progression stage based on input data).

Still further, described processes executed by machine-learning module 140 of computing device 104 may generate an output (e.g., recommended action datum 190) inclusive of a text and/or digital media-based content, such as shown by display screen 200C of FIG. 2C, generating and showing various vectors (e.g., vector 212C, vector 216C, vector 220C, and/or vector 224C) as a function of, for example, progression outlook profile 120, input datum 108, process data set 112.

In some instances, in one or more embodiments, computing device 104 is configured to receive at least an element of progression outlook profile 120. In addition, or the alternative, computing device 104 is configured to receive one or more instances of an "outlier cluster," as used for methods described in U.S. patent application Ser. No. 18/141,320, filed on Apr. 28, 2023, titled "METHOD AND AN APPARATUS FOR ROUTINE IMPROVEMENT FOR AN ENTITY," and, U.S. patent application Ser. No. 18/141,296, filed on Apr. 28, 2023, titled "SYSTEMS AND METHODS FOR DATA STRUCTURE GENERATION BASED ON OUTLIER CLUSTERING," both of which are incorporated herein by reference herein in their respective entireties. Accordingly, in this example, progression outlook profile 120 may be determined or identified using one or more outlier clusters. More particularly, described machine-learning processes may use, as inputs, one or more instances of input datum 108, process data set 112, progression outlook profile 120 in combination with the other data described herein, and use one or more associated outlier cluster elements with target outputs, such as recommended action 224B. As a result, in some instances, classifier 144 may classify inputs to target outputs including associated outlier cluster elements to generate recommended action 224B.

In addition, and without limitation, in some cases, database 170 may be local to computing device 104. In another example, and without limitation, database 170 may be remote to computing device 104 and communicative with computing device 104 by way of one or more networks. A network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which computing device 104 connects directly, dynamically, and non-hierarchically to as many other computing devices as possible. A "network topology" as used in this disclosure is an arrangement of elements of a communication network. Network may use an immutable sequential listing to securely store database 170. An "immutable sequential listing," as used in this disclosure, is a data structure that places data entries in a fixed sequential arrangement, such as a temporal sequence of entries and/or blocks thereof, where the sequential arrangement, once established, cannot be altered, or reordered. An immutable sequential listing may be, include and/or implement an immutable ledger, where data entries that have been posted to the immutable sequential listing cannot be altered.

Database 170 may include keywords. As used in this disclosure, a "keyword" is an element of word or syntax used to identify and/or match elements to each other. For example, without limitation, a keyword may be "income-generation" in the instance that a suer is seeking to increase income. In another non-limiting example, keywords of a key-phrase may be "leisure" in an example where the user is seeking to increase leisure-related activities and the like. Database 170 may be implemented, without limitation, as a relational database, a key-value retrieval datastore such as a NOSQL database, or any other format or structure for use as a datastore that a person skilled in the art, upon reviewing the entirety of this disclosure, would recognize as suitable upon review of the entirety of this disclosure.

With continued reference to FIG. 1, a "classifier," as used in this disclosure is type or operational sub-unit of any described machine-learning model or process executed by machine-learning module 140, such as a mathematical model, neural net, or program generated by a machine-learning algorithm known as a "classification algorithm" that distributes inputs into categories or bins of data, outputting the categories or bins of data and/or labels associated therewith. A classifier may be configured to classify and/or output at least a datum (e.g., one or more instances of any one or more of input datum 108, process data set 112, progression outlook profile 120, and/or progression outlook profile 120 as well as other elements of data produced, stored, categorized, aggregated or otherwise manipulated by the described processes) that labels or otherwise identifies a set of data that are clustered together, found to be close under a distance metric, or the like.

Referring again to FIG. 1, computing device 104 may be configured to identifying business impact by using classifier 144 to classify one or more instances of any one or more of input datum 108, process data set 112, progression outlook profile 120, and/or progression outlook profile 120 based on entity attributes 174 and/or stage data 178. Accordingly, classifier 144 of machine-learning module 140 may classify attributes within entity attributes 174 related to indicating in recommended action datum 190 that the entity using the described processed should proceed in modifying the described sequence of activities, that is, to increase efficiency, output, update product offerings and/or types and the like in an effort to generate progression actions describing progression from a first progression stage to a second progression stage based on input data.

In addition, in some embodiments, machine-learning module 140 performing the described correlations may be supervised. Alternatively, in other embodiments, machine-learning module 140 performing the described correlations may be unsupervised. In addition, classifier 144 may label various data (e.g., one or more instances of any one or more of input datum 108, process data set 112, progression outlook profile 120, and/or progression outlook profile 120 as well as other elements of data produced, stored, categorized, aggregated, or otherwise manipulated by the described processes) using machine-learning module 140. For example, machine-learning module 140 may label certain relevant parameters of one or more instances of input datum 108 with parameters of one or more entity attributes 174.

In addition, machine-learning processes performed by machine-learning module 140 may be trained using one or more instances of stage data 178 to, for example, more heavily weigh or consider instances of stage data 178 deemed to be more relevant to the business. More specifically, in one or more embodiments, stage data 178 may be based on or include correlations of parameters associated with input datum 108 to parameters of entity attributes 174. In addition, stage data 178 may be at least partially based on earlier iterations of machine-learning processes executed by machine-learning module 140. In some instances, running machine-learning module 140 over multiple iterations refines correlation of parameters or data describing entity operations (e.g., associated with input datum 108) with parameters describing at least entity attributes 174.

Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, computing device 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 104 may then calculate a likelihood table by calculating probabilities of different data entries and classification labels. Computing device 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, computing device 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

Further referring to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Figure 2A:
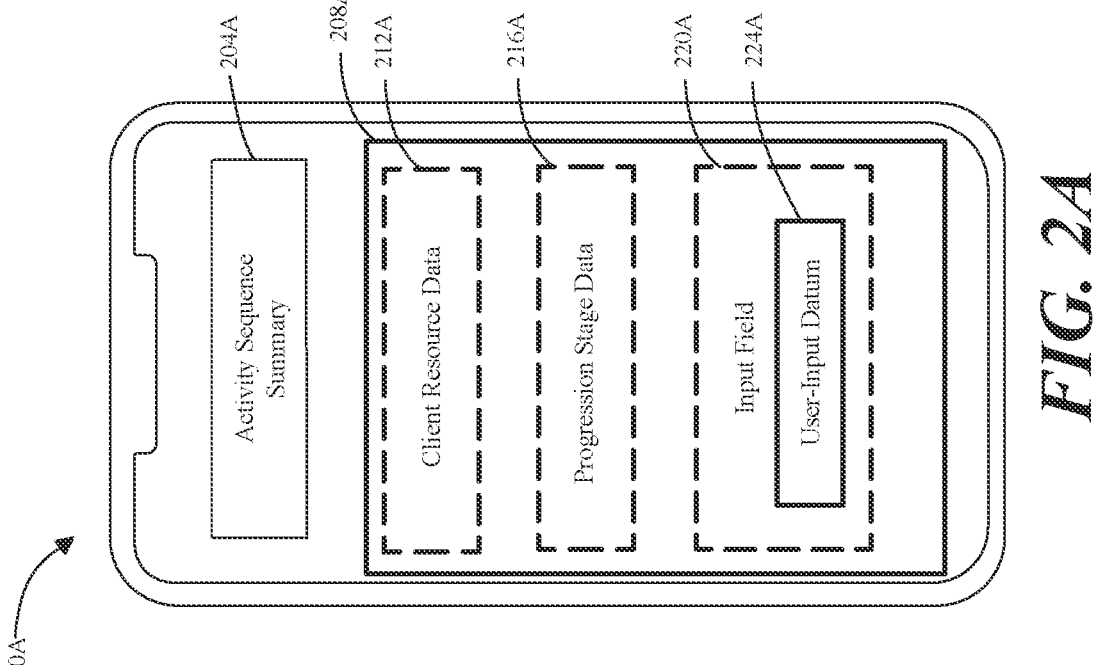

Referring now to FIGS. 2A-2B, exemplary embodiments of user input field 168 as configured to be displayed by GUI 164 of display device 160 based on an interface data structure are illustrated. As defined earlier, an "interface data structure" refers to, for example, a data organization format used to digitally request a data result or action on the data (e.g., stored in a database). In one or more embodiments, each output screen 200A-200B may be an example of an output screen configured to be displayed by display device 160 of FIG. 1 by the described interface data structure. That is, more particularly, the described interface data structure may configure display device 160 of FIG. 1 to display any one or more of output screens 200A-200B as described in the present disclosure. Accordingly, output screen 200A may include multiple forms of indicia.

In one or more embodiments, output screen 200A and output screen 200B may be examples of user input field 168 and/or GUI 164 as displayed by display device 160, which may be a "smart" phone, such as an iPhone, or other electronic peripheral or interactive cell phone, tablet, etc. Output screen 200A may be a screen initially displayed to a user (e.g., a human or a human representing or acting on behalf of a business or some other entity, and have user engagement area 208 including identification field 204A, client resource data field 212A, progression stage data field 216A, input field 220A, which may include one or more instances of user-input datum 224A describing data for selecting a preferred attribute of any one or more repayment behaviors associated with one or more instances of input datum 108.

In addition, in one or more embodiments, user-input datum 224A may be reflective of and/or provide a basis for entity attributes 174. Persons skilled in the art, upon reviewing the entirety of this disclosure, will be aware of various ways in which fewer or additional interactive user input fields may be displayed by screen 208A. Identification field 204A may identify described processes performed by processor 154 of computing device 104 by displaying identifying indicia, such as "Activity Sequence Summary" as shown in FIG. 2A to permit, for example, a human to interact with GUI 164 and input information relating to a field of choice (e.g., business operations), through (for example) interactivity provided by identification field 204A.

Such information can include data describing activities performed by the business relating to the business achieving its defined goal (e.g., progression outlook profile 120 of FIG. 1). In some instances, a human may select from one or more options (not shown in FIG. 2A) relating to prompts provided by identification field 204A to input such information relating to specific details of, for example, the business. In addition, in some embodiments, any of the described fields may include interactive features, such as prompts, permitting for a human to select additional textual and/or other digital media options further identifying or clarifying the nature of the business relating to the respective specifics of that field. For example, client resource data field 212A may display assessments of corresponding instruction sets regarding relevance and potential for positive impact on the business and may thereby also provide interactive features permitting the human to input additional data or information relating to expectations of positive of negative assessments for a given instruction set. Such additional human-input data may be computationally evaluated by described machine-learning processes executed by machine-learning module 140 and thereby correspondingly appear in the described progression sequence.

Like output screen 200A, output screen 200B may be an example of a screen subsequently shown to a human as described earlier based on human-provided input to any one or more of the displayed fields. That is, output screen 200B may display "Current Action Datum Output" in identification field 204B as indicating completion of intake of human-provided input and that described machine-learning processes have completed described classifying processes to output progression assessment area 208B to the user. For example, in one or more embodiments, progression assessment area 208B may also include multiple human-interactive fields, including progression stage profiles 212B, current process data field 216B, current assessment 220B, and recommended action 224B generated as described earlier.

Persons skilled in the art, upon reviewing the entirety of this disclosure, will be aware of various ways in which fewer or additional interactive human input fields may be displayed by output screen 200B. Each field within progression assessment area 208B may display any combination of human interactive text and/or digital media, each field intending to provide specific data-driven feedback directed to optimizing ongoing business performance of the business. Various example types of specifics (e.g., "decrease risky leverage in high interest rate conditions") are shown in progression assessment area 208B, but persons skilled in the art will be aware of other example types of feedback, each of which being generated as suitable for a given business by processor 154. In addition, in one or more embodiments, any one or more fields of progression assessment area 208B may be human-interactive, such as by posing a query for the human to provide feedback in the form of input such that described machine-learning processes performed by machine-learning module 140 may intake refined input data and correspondingly process related data and provide progression assessment area 208B. In some embodiments, such processes may be performed iteratively, thereby allowing for ongoing refinement, redirection, and optimization of progression assessment area 208B to better meet the needs of the client or user.

Figure 3:
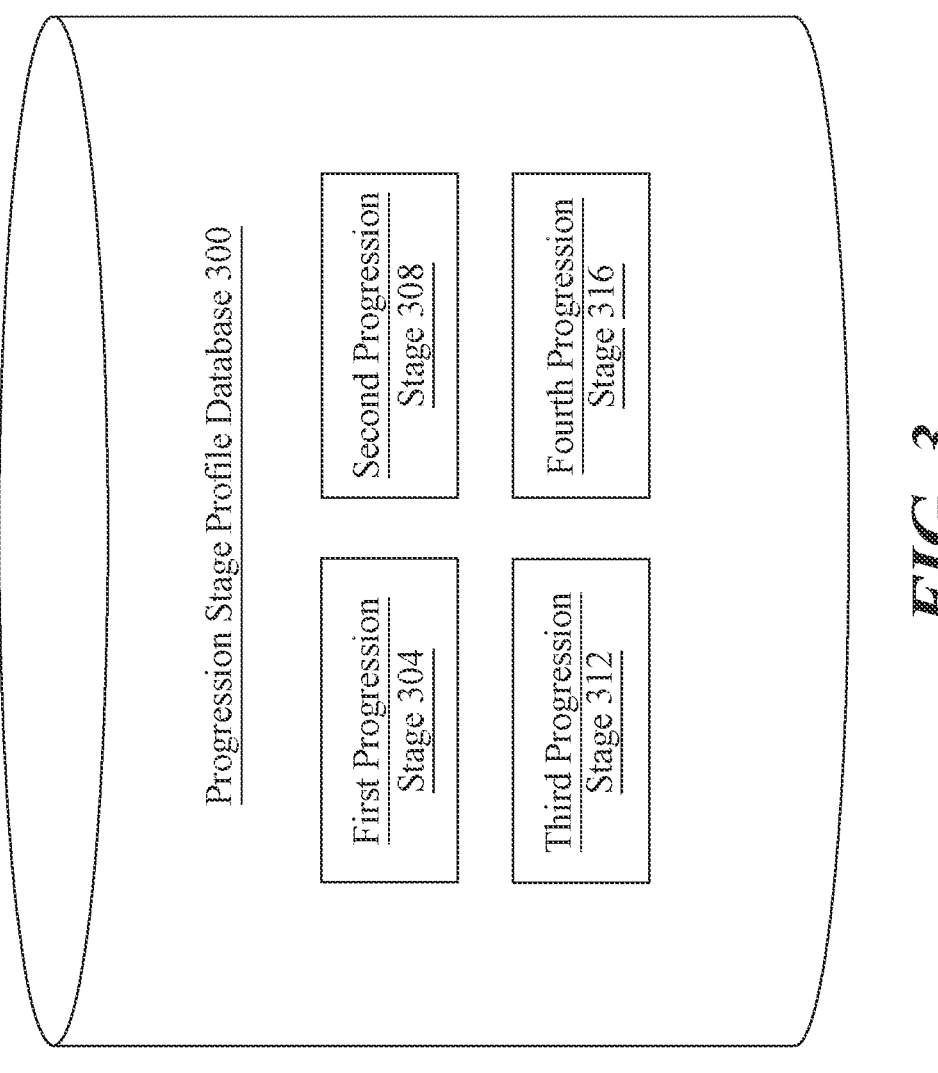
FIG. 3 is a diagrammatic representation of a transfer objective database.

Referring now to FIG. 3, an exemplary embodiment of progression stage profile database 300 is illustrated. In one or more embodiments, progression stage profile database 300 may be an example of database 170 of FIG. 1. Query database may, as a non-limiting example, organize data stored in the user activity database according to one or more database tables. One or more database tables may be linked to one another by, for instance, common column values. For instance, a common column between two tables of expert database may include an identifier of a query submission, such as a form entry, textual submission, or the like, for instance as defined below; as a result, a query may be able to retrieve all rows from any table pertaining to a given submission or set thereof. Other columns may include any other category usable for organization or subdivision of expert data, including types of query data, identifiers of interface data structures relating to obtaining information from the user, times of submission, or the like. Persons skilled in the art, upon reviewing the entirety of this disclosure, will be aware of various ways in which user activity data from one or more tables may be linked and/or related to user activity data in one or more other tables.

In addition, in one or more embodiments, computing device 104 may be configured to access and retrieve one or more specific types of entity attributes 174 and/or other data types, e.g., one or more instance of input datum 108, process data set 112, progression outlook profile 120 and/or progression outlook profile 120 categorized in multiple tables from resource allocation database 300. For example, as shown in FIG. 3, progression stage profile database 300 may be generated with multiple categories including first progression stage 304, second progression stage 308, third progression stage 312 and fourth progression stage 316. Consequently, the described processes may classify one or more instances of input datum 108 from first progression stage 304 to process data set 112 and/or user-input datum 224A that may be input user input field 168 of FIG. 1. In some instances, user-input datum 224A may describe data for selecting a preferred attribute of any one or more skills associated with one or more instances of progression outlook profile 120. In addition, described processes may retrieve data describing additional attributes related to the preferred attribute of progression outlook profile 120 from progression stage profile database 300 connected with the processor based on first progression stage 304 (e.g., or, alternatively, one or more of second progression stage 308, third progression stage 312, and/or fourth progression stage 316, etc.).

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm instantiated in hardware or software logic, data structures, and/or functions that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative training data may include multiple data entries as inputs, each entry representing a set of data elements that were recorded, received, and/or generated together and described various confidence levels or traits relating to demonstrations of confidence. Outputs such as data elements may be correlated by shared existence in each data entry, by proximity in a given data entry, or the like. In another non limiting example training data may include one or more instances of any one or more of input datum 108, process data set 112, progression outlook profile 120, and/or progression outlook profile 120, as well as stage data 178 and/or entity attributes 174 as described above as inputs, recommended action 224B and/or similar textual and/or visual imagery (e.g., digital photos and/or videos) relating to providing recommended action 224B to a user as output.

As a non-limiting illustrative example, input data may include one or more instances of any one or more of input datum 108, process data set 112, progression outlook profile 120, and/or progression outlook profile 120, as well as stage data 178 and/or entity attributes 174, to provide the instruction set as may be determined as described earlier, such as where at least some instances of the progression outlook profile 120 exceeding a threshold (e.g., that may be user-defined and input into user input field 168, or externally defined) are aggregated to define and display the instruction set to the user. In addition, in one or more embodiments, the interface data structure as described herein includes one or more interface data structures, any one of which may include an interface that defines a set of operations supported by a data structure and related semantics, or meaning, of those operations. For example, in the context of personal performance improvement coaching, interface data structure may include one or more interface data structures that may appear to the user in the form of one or more text-based or other digital media-based surveys, questionnaires, lists of questions, examinations, descriptions, etc.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to descriptors such as progression stage profile where each progression stage profile is representative of a respective progression stage as described above. In some cases, inputs and outputs may be classified to a particular progression stage wherein a particular input classified to a particular progression stage may contain a correlated output correlated to the same progression stage.

With further reference to FIG. 4, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 4, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 4, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 4, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units In some embodiments, and with continued reference to FIG. 4, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs as described above as inputs, outputs as described above as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

With further reference to FIG. 4, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 4, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 432 may not require a response variable; unsupervised processes 432 may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 4, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 4, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 4, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 4, one or more processes or algorithms described above may be performed by at least a dedicated hardware unit 436. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 436 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 436 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 436 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 5:
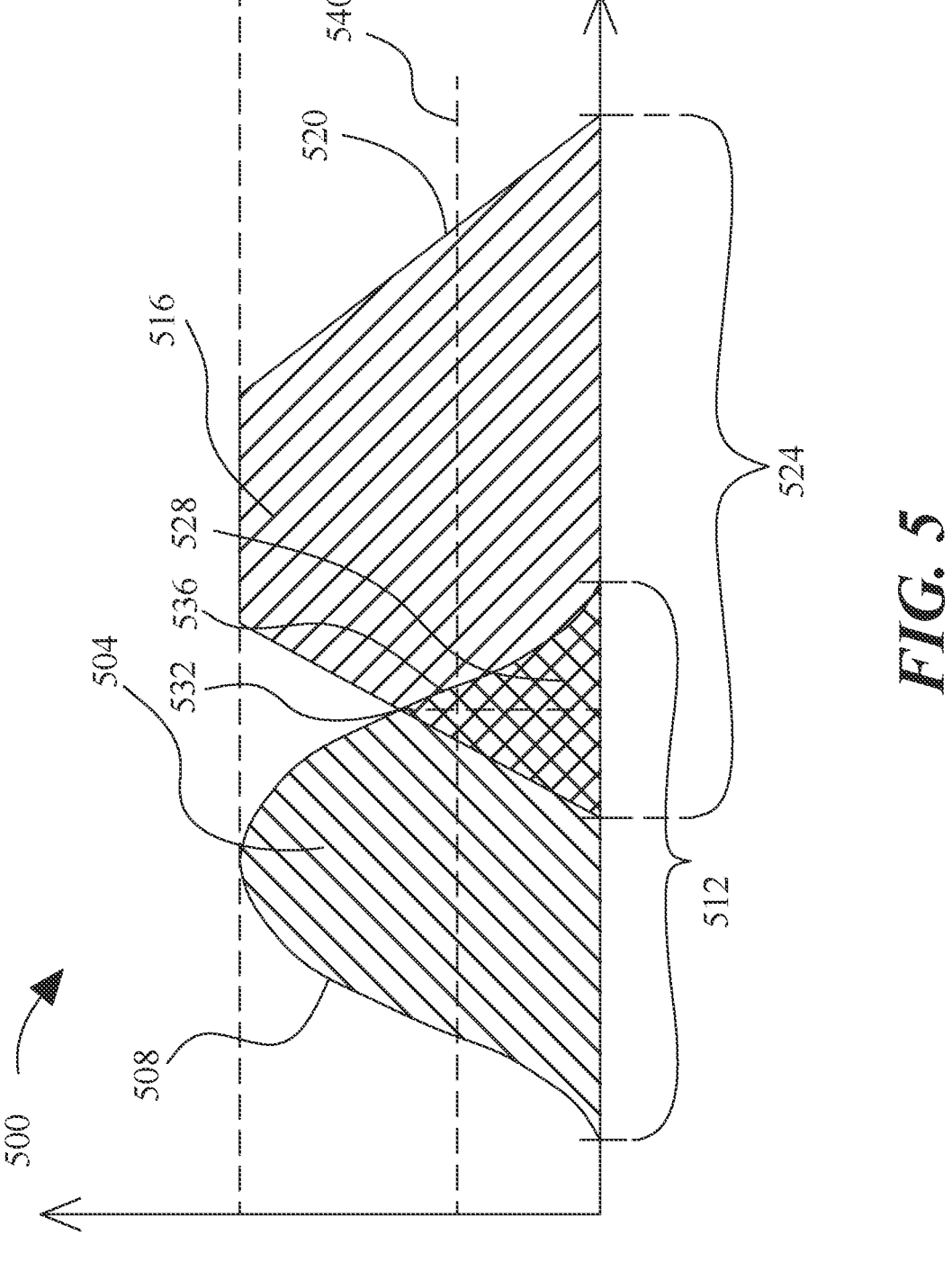
FIG. 5 is a graph illustrating an exemplary relationship between fuzzy sets.

Referring to FIG. 5, an exemplary embodiment of fuzzy set comparison 500 is illustrated. In one or more embodiments, data describing any described process relating to providing a skill factor hierarchy to a user as performed by processor 154 of computing device 104 may include data manipulation or processing including fuzzy set comparison 500. In addition, in one or more embodiments, usage of an inference engine relating to data manipulation may involve one or more aspects of fuzzy set comparison 500 as described herein. That is, although discrete integer values may be used as data to describe, for example, one or more instances of any one or more of input datum 108, process data set 112, progression outlook profile 120, and/or progression outlook profile 120, as well as stage data 178 and/or entity attributes 174, fuzzy set comparison 500 may be alternatively used. For example, a first fuzzy set 504 may be represented, without limitation, according to a first membership function 508 representing a probability that an input falling on a first range of values 512 is a member of the first fuzzy set 504, where the first membership function 508 has values on a range of probabilities such as without limitation the interval [0,1], and an area beneath the first membership function 508 may represent a set of values within first fuzzy set 504. Although first range of values 512 is illustrated for clarity in this exemplary depiction as a range on a single number line or axis, first range of values 512 may be defined on two or more dimensions, representing, for instance, a Cartesian product between a plurality of ranges, curves, axes, spaces, dimensions, or the like. First membership function 508 may include any suitable function mapping first range of values 512 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \le x < b \\ \frac{c-x}{c-b}, & \text{if } b < x \le c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 5, first fuzzy set 504 may represent any value or combination of values as described above, including output from one or more machine-learning models, one or more instances of any one or more of input datum 108, process data set 112, progression outlook profile 120, and/or progression outlook profile 120, as well as stage data 178 and/or entity attributes 174, and a predetermined class, such as without limitation, query data or information including interface data structures stored in progression stage profile database 300 of FIG. 3. A second fuzzy set 516, which may represent any value which may be represented by first fuzzy set 504, may be defined by a second membership function 520 on a second range of values 524; second range of values 524 may be identical and/or overlap with first range of values 512 and/or may be combined with first range via Cartesian product or the like to generate a mapping permitting evaluation overlap of first fuzzy set 504 and second fuzzy set 516. Where first fuzzy set 504 and second fuzzy set 516 have a region 528 that overlaps, first membership function 508 and second membership function 520 may intersect at a point 532 representing a probability, as defined on probability interval, of a match between first fuzzy set 504 and second fuzzy set 516. Alternatively, or additionally, a single value of first and/or second fuzzy set may be located at a locus 536 on first range of values 512 and/or second range of values 524, where a probability of membership may be taken by evaluation of first membership function 508 and/or second membership function 520 at that range point. A probability at 528 and/or 532 may be compared to a threshold 540 to determine whether a positive match is indicated. Threshold 540 may, in a non-limiting example, represent a degree of match between first fuzzy set 504 and second fuzzy set 516, and/or single values therein with each other or with either set, which is sufficient for purposes of the matching process; for instance, threshold may indicate a sufficient degree of overlap between an output from one or more machine-learning models one or more instances of any one or more of input datum 108, process data set 112, progression outlook profile 120, and/or progression outlook profile 120, as well as stage data 178 and/or entity attributes 174 and a predetermined class, such as without limitation, query data categorization, for combination to occur as described above. Alternatively, or additionally, each threshold may be tuned by a machine-learning and/or statistical process, for instance and without limitation as described in further detail below.

Further referring to FIG. 5, in an embodiment, a degree of match between fuzzy sets may be used to classify one or more instances of any one or more of input datum 108, process data set 112, progression outlook profile 120, and/or progression outlook profile 120, to as well as stage data 178 and/or entity attributes 174 stored in resource allocation database 300. For instance, if input datum 108 and/or interface data structure 112 has a fuzzy set matching certain interface data structure data values stored in progression stage profile database 300 (e.g., by having a degree of overlap exceeding a threshold), computing device 104 may classify one or more instances of any one or more of input datum 108, process data set 112, progression outlook profile 120, and/or progression outlook profile 120 as belonging to entity attributes 174 (e.g., aspects of user behavior as demonstrated by entity attributes 174 of FIG. 1 and/or second progression stage 308 of FIG. 3 relating to user commitment towards achieving progression outlook profile 120). Where multiple fuzzy matches are performed, degrees of match for each respective fuzzy set may be computed and aggregated through, for instance, addition, averaging, or the like, to determine an overall degree of match.

Still referring to FIG. 5, in an embodiment, input datum 108 and/or process data set 112 may be compared to multiple progression stage profile database 300 categorization fuzzy sets. For instance, input datum 108 and/or process data set 112 may be represented by a fuzzy set that is compared to each of the multiple progression stage profile database 300 categorization fuzzy sets; and a degree of overlap exceeding a threshold between the input datum 108 and/or process data set 112 fuzzy set and any of the progression stage profile database 300 categorization fuzzy sets may cause computing device 104 to classify one or more instances of any one or more of input datum 108, process data set 112, progression outlook profile 120, and/or progression outlook profile 120 as belonging to one or more corresponding interface data structures associated with progression stage profile database 300 categorization (e.g., selection from categories in resource allocation database 300, etc.). For instance, in one embodiment there may be two progression stage profile database 300 categorization fuzzy sets, representing, respectively, progression stage profile database 300 categorization (e.g., into each of first progression stage 304, second progression stage 308, third progression stage 312, and/or fourth progression stage 316). For example, a First progression stage profile database 300 categorization may have a first fuzzy set; a Second progression stage profile database 300 categorization may have a second fuzzy set; and one or more instances of any one or more of input datum 108, process data set 112, progression outlook profile 120, and/or progression outlook profile 120, to as well as stage data 178 and/or entity attributes 174 may each have a corresponding fuzzy set.

Computing device 104, for example, may compare one or more instances of any one or more of input datum 108, process data set 112, progression outlook profile 120, and/or progression outlook profile 120, to as well as stage data 178 and/or entity attributes 174 fuzzy sets with fuzzy set data describing each of the categories included in resource allocation database 300, as described above, and classify one or more instances of any one or more of input datum 108, process data set 112, progression outlook profile 120, and/or progression outlook profile 120, to as well as stage data 178 and/or entity attributes 174 to one or more categories (e.g., first progression stage 304, second progression stage 308, third progression stage 312, and/or fourth progression stage 316). Machine-learning methods as described throughout may, in a non-limiting example, generate coefficients used in fuzzy set equations as described above, such as without limitation x, c, and σ of a Gaussian set as described above, as outputs of machine-learning methods. Likewise, any described datum herein may be used indirectly to determine a fuzzy set, as, for example, input datum 108 fuzzy set and/or process data set 112 fuzzy set may be derived from outputs of one or more machine-learning models that take input datum 108 and/or process data set 112 directly or indirectly as inputs.

Still referring to FIG. 5, a computing device may use a logic comparison program, such as, but not limited to, a fuzzy logic model to determine a progression stage profile database 300 response. A progression stage profile database 300 response may include, but is not limited to, accessing and/or otherwise communicating with any one or more of first progression stage 304, second progression stage 308, third progression stage 312, fourth progression stage 316, and the like; each such progression stage profile database 300 response may be represented as a value for a linguistic variable representing progression stage profile database 300 response or in other words a fuzzy set as described above that corresponds to a degree of matching between data describing input datum 108 and/or process data set 112 and one or more categories within progression stage profile database 300 as calculated using any statistical, machine-learning, or other method that may occur to a person skilled in the art upon reviewing the entirety of this disclosure.

In some embodiments, determining a progression stage profile database 300 categorization may include using a linear regression model. A linear regression model may include a machine-learning model. A linear regression model may be configured to map data of input datum 108 and/or process data set 112, to one or more progression stage profile database 300 parameters. A linear regression model may be trained using a machine-learning process. A linear regression model may map statistics such as, but not limited to, quality of input datum 108 and/or process data set 112. In some embodiments, determining progression stage profile database 300 of input datum 108 and/or process data set 112 may include using a progression stage profile database 300 classification model. A progression stage profile database 300 classification model may be configured to input collected data and cluster data to a centroid based on, but not limited to, frequency of appearance, linguistic indicators of quality, and the like. Centroids may include scores assigned to them such that quality of input datum 108 and/or process data set 112 may each be assigned a score.

In some embodiments, progression stage profile database 300 classification model may include a K-means clustering model. In some embodiments, progression stage profile database 300 classification model may include a particle swarm optimization model. In some embodiments, determining the progression stage profile database 300 of input datum 108 and/or process data set 112 may include using a fuzzy inference engine (e.g., to assess the progress of the user and use said data to amend or generate new strategies based on user progress). A fuzzy inference engine may be configured to map one or more instances of any one or more of input datum 108, process data set 112, progression outlook profile 120, and/or progression outlook profile 120, to as well as stage data 178 and/or entity attributes 174 data elements using fuzzy logic. In some embodiments, the described datum may be arranged by a logic comparison program into progression stage profile database 300 arrangement. A "progression stage profile database 300 arrangement" as used in this disclosure is any grouping of objects and/or data based on similarity to each other and/or relation to providing recommended action 224B of FIG. 2B to the user for the user to achieve. This step may be implemented as described above in FIG. 1.

Membership function coefficients and/or constants as described above may be tuned according to classification and/or clustering algorithms. For instance, and without limitation, a clustering algorithm may determine a Gaussian or other distribution of questions about a centroid corresponding to a given scoring level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 5, an inference engine may be implemented to assess the progress of the user and use said data to amend or generate new strategies based on user progress according to input and/or output membership functions and/or linguistic variables. For instance, a first linguistic variable may represent a first measurable value pertaining to input datum 108 and/or process data set 112, such as a degree of matching between data describing user aspirations and strategies based on responses to interface data structures stored in resource allocation database 300. Continuing the example, an output linguistic variable may represent, without limitation, a score value. An inference engine may combine rules, such as: "if the demonstrated commitment level of a person or business falls beneath a threshold," and "the observed performance of the person or business relative to their or its peers is deficient," the commitment score is "deficient"—the degree to which a given input function membership matches a given rule may be determined by a triangular norm or "T-norm" of the rule or output membership function with the input membership function, such as min $(a, b)$, product of a and b, drastic product of a and b, Hamacher product of a and b, or the like, satisfying the rules of commutativity $(T(a, b)=T(b, a))$, monotonicity: $(T(a, b) \leq T(c, d)$ if $a \leq c$ and $b \leq d)$, (associativity: $T(a, T(b, c))=T(T(a, b), c))$, and the requirement that the number 1 acts as an identity element. Combinations of rules ("and" or "or"

combination of rule membership determinations) may be performed using any T-conorm, as represented by an inverted T symbol or "⊥," such as max (a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively, or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively, or additionally, output rules may be replaced with functions according to the Takagi-Sugeno-King (TSK) fuzzy model.

Now referring to FIG. 6, method 600 for multiple stage process modeling is described. At step 605, method 600 includes receiving, by a computing device, a plurality of process data sets, each process data set representing a progression stage, wherein the progression stage describes a sequence of activities performed by an entity device. This step may be implemented as described above, without limitation, in FIGS. 1-7.

Still referring to FIG. 6, at step 610, method 600 includes generating, by the computing device, using at least some of the plurality of process data sets and a machine learning algorithm, a progression outlook profile comprising a plurality of progression stage profiles, each progression stage profile representative of a respective progression stage and configured to generate progression actions describing progression from a first progression stage to a second progression stage based on input data; and a progression stage profile classifier configured to use input data and identify a progression stage currently occupied by a process based on input data. This step may be implemented as described above, without limitation, in FIGS. 1-7.

Still referring to FIG. 6, at step 615, method 600 includes receiving, by the computing device, current process data describing at least a process to be analyzed, wherein the process includes a current assessment of the sequence of activities performed by the entity device. This step may be implemented as described above, without limitation, in FIGS. 1-7.

Still referring to FIG. 6, at step 620, method 600 includes classifying, by the computing device, received current process data to a progression stage profile using the progression stage profile classifier, wherein classifying comprises classifying the current assessment to at least the first progression stage. This step may be implemented as described above, without limitation, in FIGS. 1-7.

Still referring to FIG. 6, at step 625, method 600 includes outputting, by the computing device, at least a current action datum using the progression stage profile, wherein output comprises at least a recommended action for the entity device. This step may be implemented as described above, without limitation, in FIGS. 1-7.

Still referring to FIG. 6, at step 630, method 600 includes generating, by the computing device, an interface data structure including an input field, wherein the interface data structure configures a remote display device to display at least an input field; receive at least a user-input datum into the input field, wherein the user-input datum describes data for updating at least the sequence of activities performed by the entity device; and display the recommended action for the entity device including data based on the user-input datum. This step may be implemented as described above, without limitation, in FIGS. 1-7.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
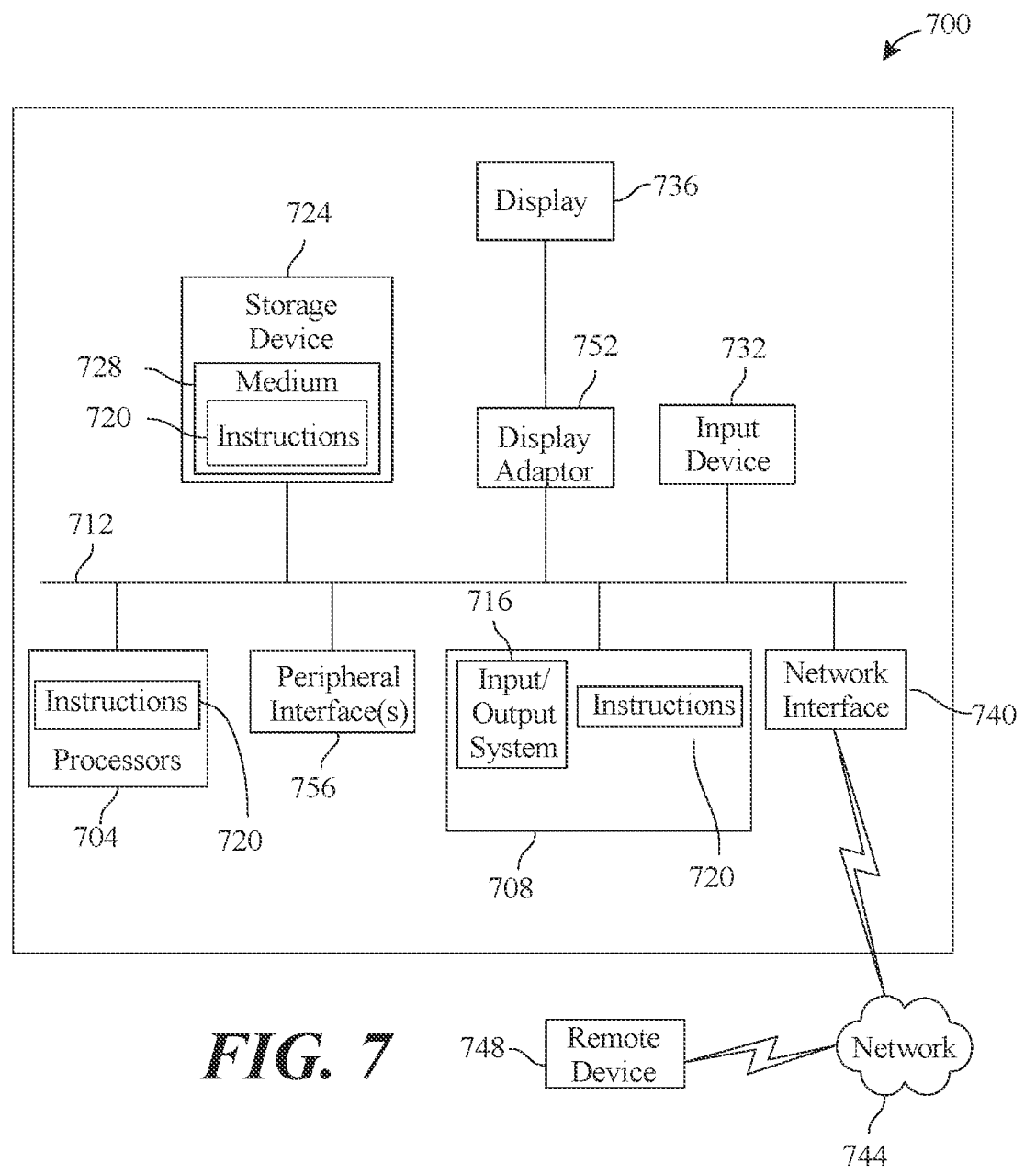
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIRE-WIRE interface, a direct interface to bus 712, and any combinations thereof. Input device 732 may include a touch screen interface that may be a part of or separate from display device 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Video display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate to provide a multiplicity of feature combinations in associated new embodiments. Furthermore, while the foregoing describes several separate embodiments, what has been described herein is merely illustrative of the application of the principles of the present invention. Additionally, although particular methods herein may be illustrated and/or described as being performed in a specific order, the ordering is highly variable within ordinary skill to achieve methods, apparatus, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for multiple stage process modeling, the apparatus comprising:

a reconfigurable hardware module;

at least a processor communicatively connected to the reconfigurable hardware module; and a memory connected to the at least a processor, the memory containing instructions configuring the at least a processor to:

receive a plurality of process data sets, each process data set representing a progression stage, wherein the progression stage describes a sequence of activities;

instantiate, at the reconfigurable hardware module, a progression stage profile classifier, wherein the progression stage profile classifier is generated, by a machine-learning module of the at least a processor, using a linear regression technique wherein the machine-learning module is configured to iteratively retrain the progression stage profile classifier based on user inputs indicating sub-optimal performance by performing an auditing process, wherein the progression stage profile classifier comprises a machine learning model and wherein iteratively retraining the progression stage profile classifier comprises:

sanitizing a training data of the progression stage profile classifier by eliminating training examples of the training data in order to reduce an interference of a convergence of the machine learning model in order to increase an accuracy of the machine learning model, and wherein the training examples comprise exemplary inputs and exemplary outputs;

generate, using at least some of the plurality of process data sets and the instantiated progression stage profile classifier, a progression outlook profile comprising:

a plurality of progression stage profiles, each progression stage profile representative of a respective progression stage and configured to generate progression actions describing progression from a first progression stage to a second progression stage based on input data;

receive current process data describing at least a process to be analyzed, wherein the process includes a current assessment of the sequence of activities;

classify received current process data to a progression stage profile using the progression stage profile classifier, wherein classifying comprises classifying the current assessment to at least the first progression stage;

output at least a current action datum using the progression stage profile, wherein output comprises at least a recommended action for an entity device;

generate an interface data structure including an input field, wherein the interface data structure configures a remote display device to:

display at least an input field;

receive at least a user-input datum into the input field, wherein the user-input datum describes data for updating at least the sequence of activities;

generate an activity sequence summary based on the updated sequence of activities;

display the recommended action for the entity device including data based on the user-input datum and the activity sequence summary; and display at least a vector from the current assessment to the second progression stage, wherein the vector represents a divergence value, and wherein the divergence value describes a divergence between a first numerical classification of the current assessment and a second numerical classification of the second progression stage.

2. The apparatus of claim 1, wherein generating the interface data structure further comprises:

retrieving data describing attributes of the entity device from a database communicatively connected to the processor; and generating the interface data structure based on the data describing attributes of the entity device.

3. The apparatus of claim 1, wherein generating the recommended action for the entity device comprises:

retrieving data describing current preferences of the entity device between a minimum value and a maximum value from a database communicatively connected to the processor, wherein retrieving data further comprises receiving at least a form element input into the input field.

4. The apparatus of claim 1, further comprising generating at least an additional input field based on a divergence value that describes divergence between the current assessment to the second progression stage.

5. The apparatus of claim 1, wherein generating the recommended action for the entity device comprises:

classifying at least an instance of the current assessment to the second progression stage;

determining a proximity of a respective current assessment to the second progression stage calculated based on at least the user-input datum; and adjusting the recommended action to reduce the proximity.

6. The apparatus of claim 1, wherein generating the recommended action for the entity device further comprises:

classifying the current assessment to the second progression stage, wherein classifying the current assessment further comprises:

comparing the current assessment to the second progression stage; and determining a parity value based on comparison of the current assessment to the second progression stage, wherein the parity value is included within the recommended action.

7. The apparatus of claim 4, wherein generating the recommended action for the entity device further comprises:

determining a pattern, wherein the pattern describes entity interaction with a database communicatively connected to the processor;

classifying at least an element of the pattern to the divergence value; and adjusting the pattern based on a magnitude of the divergence value.

8. The apparatus of claim 1, wherein generating the recommended action for the entity device further comprises:

classifying one or more new instances of the user-input datum to at least the second progression stage;

generating at least a divergence value between the user-input datum and at least the second progression stage based on the classification; and displaying the divergence value.

9. A method for multiple stage process modeling, the method comprising:

receiving, by a computing device incorporating a reconfigurable hardware module, a plurality of process data sets, each process data set representing a progression stage, wherein the progression stage describes a sequence of activities performed by an entity device;

instantiating, at the reconfigurable hardware module, a progression stage profile classifier, wherein the progression stage profile classifier is generated, by a machine-learning module of the at least a processor, using a linear regression technique wherein the machine-learning module is configured to iteratively retrain the progression stage profile classifier based on user inputs indicating sub-optimal performance by performing an auditing process, wherein the progression stage profile classifier comprises a machine learning model and wherein iteratively retraining the progression stage profile classifier comprises:

sanitizing a training data of the progression stage profile classifier by eliminating training examples of the training data in order to reduce an interference of a convergence of the machine learning model to increase an accuracy of the machine learning model, and wherein the training examples comprise exemplary inputs and exemplary outputs;

generating, using at least some of the plurality of process data sets and the instantiated progression stage profile classifier, a progression outlook profile comprising:

a plurality of progression stage profiles, each progression stage profile representative of a respective progression stage and configured to generate progression actions describing progression from a first progression stage to a second progression stage based on input data;

receiving, by the computing device, current process data describing at least a process to be analyzed, wherein the process includes a current assessment of the sequence of activities performed by an entity device;

classifying, by the computing device, received current process data to a progression stage profile using the progression stage profile classifier, wherein classifying comprises classifying the current assessment to at least the first progression stage;

outputting, by the computing device, at least a current action datum using the progression stage profile, wherein output comprises at least a recommended action for the entity device;

generating, by the computing device, an interface data structure including an input field, wherein the interface data structure configures a remote display device to:

display at least an input field;

receive at least a user-input datum into the input field, wherein the user-input datum describes data for updating at least the sequence of activities performed by the entity device;

generate an activity sequence summary based on the updated sequence of activities performed by the entity device;

display the recommended action for the entity device including data based on the user-input datum and the activity sequence summary; and display at least a vector from the current assessment to the second progression stage, wherein the vector represents a divergence value, wherein the divergence value describes a divergence between a first numerical classification of the current assessment and a second numerical classification of the second progression stage.

10. The method of claim 9, wherein generating the interface data structure further comprises:

retrieving data describing attributes of the entity device from a database communicatively connected to the computing device; and generating the interface data structure based on the data describing attributes of the entity device.

11. The method of claim 9, further comprising generating at least an additional input field based on a divergence value that describes divergence between the current assessment to the second progression stage.

12. The method of claim 9, wherein generating the recommended action for the entity device comprises:

classifying at least an instance of the current assessment to the second progression stage;

determining a proximity of a respective current assessment to the second progression stage calculated based on at least the user-input datum; and adjusting the recommended action to reduce the proximity.

13. The method of claim 9, wherein generating the recommended action for the entity device further comprises:

classifying the current assessment to the second progression stage, wherein classifying the current assessment further comprises:

comparing the current assessment to the second progression stage; and determining a parity value based on comparison of the current assessment to the second progression stage, wherein the parity value is included within the recommended action.

14. The method of claim 11, wherein generating the recommended action for the entity device further comprises:

determining a pattern, wherein the pattern describes entity interaction with a database communicatively connected to the computing device;

classifying at least an element of the pattern to the divergence value; and adjusting the pattern based on a magnitude of the divergence value.

15. The method of claim 9, wherein generating the recommended action for the entity device further comprises:

classifying one or more new instances of the user-input datum to at least the second progression stage;

generating at least a divergence value between the user-input datum and at least the second progression stage based on the classification; and displaying the divergence value.

16. The apparatus of claim 1, wherein the vector is positioned and arranged to connect a first numerical classification of the current assessment to a second numerical classification of the second progression stage.

17. The method of claim 9, wherein the vector is positioned and arranged to connect a first numerical classification of the current assessment to a second numerical classification of the second progression stage.

\* \* \* \* \*